United States Patent
Xia et al.

(10) Patent No.: US 10,473,978 B2
(45) Date of Patent: Nov. 12, 2019

(54) LIGHT GUIDE ASSEMBLY, BACKLIGHT MODULE, DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Xiaoli Xia, Beijing (CN); Xiaozeng Pei, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

(*) Notice: Subject to any disclaimer, the term of this patent is extended or adjusted under 35 U.S.C. 154(b) by 0 days.

(21) Appl. No.: 15/512,513

(22) PCT Filed: Aug. 19, 2016

(86) PCT No.: PCT/CN2016/095959
§ 371 (c)(1),
(2) Date: Mar. 17, 2017

(87) PCT Pub. No.: WO2017/118035
PCT Pub. Date: Jul. 13, 2017

(65) Prior Publication Data
US 2018/0231842 A1    Aug. 16, 2018

(30) Foreign Application Priority Data

Jan. 5, 2016   (CN) .......................... 2016 1 0001520

(51) Int. Cl.
*G02F 1/1335*   (2006.01)
*F21V 8/00*   (2006.01)

(52) U.S. Cl.
CPC ...... *G02F 1/133611* (2013.01); *G02B 6/0025* (2013.01); *G02B 6/0065* (2013.01);
(Continued)

(58) Field of Classification Search
CPC ......... G02F 1/133611; G02F 1/133608; G02B 6/0025; G02B 6/0051; G02B 6/0055; G02B 6/0065; G02B 6/0088
(Continued)

(56) References Cited

U.S. PATENT DOCUMENTS 6,055,029 A    4/2000   Kurihara et al.
2004/0240194 A1*  12/2004  Lao ..................... G02B 6/0043
                                                362/627
(Continued)

FOREIGN PATENT DOCUMENTS

CN   1591123 A   3/2005
CN   1598621 A   3/2005
(Continued)

OTHER PUBLICATIONS

Office Action received for Chinese Patent Application No. 201610001520.3, dated Jan. 26, 2018, 15 pages (8 pages of English Translation and 7 pages of Office Action).
(Continued)

*Primary Examiner* — Anh T Mai
*Assistant Examiner* — Jessica M Apenteng
(74) *Attorney, Agent, or Firm* — Womble Bond Dickinson (US) LLP (57) ABSTRACT

A light guide assembly for a backlight module is disclosed, comprising a metal element and a light guide element which are integrated together. At least a portion of at least a side surface of the light guide element is used to receive light emitted from a light source to generate backlight, and the metal element surrounds a side surface of the light guide element that is not used to receive light from the light source. In this way, the backlight module can omit the structures such as rubber frame, backplate, and the like, while the overall mechanical strength of the backlight module can be
(Continued)

ensured, the thickness of the backlight module can be decreased to meet the requirement on thinning of the display device, and the production and maintenance costs can be reduced.

13 Claims, 3 Drawing Sheets

(52) U.S. Cl.
CPC ..... *G02B 6/0088* (2013.01); *G02F 1/133608* (2013.01); *G02B 6/0051* (2013.01); *G02B 6/0055* (2013.01)

(58) Field of Classification Search
USPC ................................................ 362/97.1–97.3
See application file for complete search history.

(56) References Cited

U.S. PATENT DOCUMENTS

| | | |
|---|---|---|
| 2009/0168454 A1 | 7/2009 | Lee et al. |
| 2015/0131314 A1 | 5/2015 | Chang |
| 2015/0277029 A1* | 10/2015 | Watanabe ......... G02F 1/133308 362/606 |
| 2016/0327733 A1 | 11/2016 | Liu et al. |
| 2017/0045676 A1 | 2/2017 | Zhou |

FOREIGN PATENT DOCUMENTS

| | | |
|---|---|---|
| CN | 1696783 A | 11/2005 |
| CN | 1731251 A | 2/2006 |
| CN | 101201493 A | 6/2008 |
| CN | 101241257 A | 8/2008 |
| CN | 101476697 A | 7/2009 |
| CN | 202918621 U | 5/2013 |
| CN | 204065622 U | 12/2014 |
| CN | 104360541 | 2/2015 |
| CN | 104633531 A | 5/2015 |
| CN | 204331224 U | 5/2015 |
| CN | 104678630 A | 6/2015 |
| CN | 104791660 A | 7/2015 |
| CN | 204629218 U | 9/2015 |
| CN | 204829530 U | 12/2015 |
| CN | 204855992 U | 12/2015 |
| CN | 105527673 A | 4/2016 |
| JP | 2002-116440 A | 4/2002 |
| KR | 10-0556031 B1 | 2/2006 |

OTHER PUBLICATIONS

International Search Report with English language translation, dated Nov. 25, 2016, International Application No. PCT/CN2016/095959.

Office Action received for Chinese Patent Application No. 201610001520.3, dated Sep. 26, 2018, 17 pages (8 pages of English Translation and 9 pages of Office Action).

"Extended European Search Report," EP Application No. 16843281.3 dated Jul. 11, 2019.

* cited by examiner

LIGHT GUIDE ASSEMBLY, BACKLIGHT MODULE, DISPLAY DEVICE

RELATED APPLICATIONS

The present application is the U.S. national phase entry of PCT/CN2016/095959, with an international filling date of Aug. 19, 2016, which claims the benefit of Chinese Patent Application NO. 201610001520.3, filed on Jan. 5, 2016, the entire disclosure of which is incorporated herein by reference.

FIELD OF THE DISCLOSURE

The present disclosure relates to the field of display technologies, and particularly to a light guide assembly, a backlight module and a display device comprising such backlight module.

BACKGROUND

With the development of science and technology, the market has placed increasing requirements on various types of display devices. For example, ultra-thin, narrow frames, etc. have become the desired characteristics for many display devices. To this end, it is usually required to improve the design for relevant components of the display device. For example, the backlight module needs to be made thinner to occupy as little space as possible. Therefore, components such as the rubber frame in the backlight module are typically designed to be thinner and narrower. However, the thinner rubber frame is easy to soften, causing trouble in the usage and maintenance for the backlight module, meanwhile it is advantageous for the mechanical strength of the backlight module. To overcome this drawback, some backlight modules are also provided with a backplate structure. However, adding a backplate structure does not coincide with the thinning requirement on the backlight module.

SUMMARY

It is an objective of embodiments of the disclosure to propose an improved light guide assembly, a backlight module comprising such a light guide assembly, and a display device, so as to facilitate thinning of the display device and to alleviate or avoid at least some of the problems mentioned above.

In the embodiments of the present disclosure, the proposed light guide assembly for the backlight module comprises a metal element and a light guide element which are integrated together. At least a portion of at least one side surface of the light guide element is used to receive light emitted from a light source to generate backlight, and the metal element surrounds side surfaces of the light guide element that are not used to receive light from the light source.

As for the light guide assembly provided by embodiments of the present disclosure, since the metal element and the light guide element are integrated together, it has a large mechanical strength to support the respective elements thereon when applied to the backlight module, and the metal element can further prevent light leakage from the light guide element. Therefore, when the light guide assembly provided by embodiments of the present disclosure is applied, the rubber frame and the backplate can be omitted from the backlight module. In this way, the problems existing in the conventional backlight module that comprises a rubber frame or backplate can be alleviated or eliminated, while the overall mechanical strength of the backlight module can be further ensured, the thickness of the backlight module may be decreased to meet the requirement on thinning of the display device, and the production and maintenance costs of the backlight module are reduced.

In an embodiment, the metal element comprises at least one hole penetrating at least a surface of the metal element close to the light guide element, the hole being filled with a material of the light guide element. Therefore, such a hole may be a through-hole that penetrates the metal element completely or a blind hole that penetrates only the inner surface of the metal element. Since the material of the light guide element surrounded by the metal element is also filled into the hole of the metal element, this hole can enhance the firmness of bonding between the metal element and the light guide element.

Further, such a hole may be a tapered hole. The tapered hole can provide stronger bonding force between the metal element and the light guide element.

In another embodiment, the light guide assembly may further comprise a light-proof element for covering the hole. The arrangement of the light-proof element can alleviate or eliminate possible light leakage caused by the hole.

Further, the light-proof element comprises an ink coating or a light-proof adhesive tape.

Alternatively, in a further embodiment, the surface of the metal element in contact with the light guide element is at least partially a rough surface. It can be understood that the rough surface can provide stronger bonding force between the metal element and the light guide element, thereby enhancing the firmness of bonding between the metal element and the light guide element.

Alternatively, in a further embodiment, the metal element comprises a first portion and a second portion connected together. The first portion surrounds a side surface of the light guide element that is not used to receive light from the light source, and the second portion is embedded into the light guide element and may form a certain angle with respect to first portion. Therefore, with the metal element comprising the first portion and the second portion, the metal element can contact not only the side surface of the light guide element via the first portion, but also contact other surfaces (such as upper surface or lower surface) of the light guide element via the second portion, thereby enhancing the firmness of bonding between the light guide element and the metal element.

Alternatively, in a further embodiment, at least one of two ends of the metal element is embedded into the light guide element.

Another embodiment of the present disclosure further provides a backlight module not having a backplate and a rubber frame, which comprises a light source and the light guide assembly provided by any of the embodiments above.

In another embodiment, the backlight module further comprises an optical element above the light guide assembly.

Further, the light guide element comprises a raised structure perpendicular to its upper surface for carrying the optical element.

Further, the raised structure comprises a first step and a second step for carrying different optical elements.

A further embodiment of the present disclosure provides a display device which may comprise the backlight module provided by any of the embodiments above. Such a display device may be any display device that requires a backlight module as a backlight source, including, but not limited to, any electrical apparatus having display function such as LCD display, television set, mobile phone, personal digital assistant, tablet computer, notebook computer, desktop computer, and the like.

The light guide assembly provided by embodiments of the disclosure can be applied to a backlight module so that the backlight module can omit the rubber frame and the backplate, which alleviates or eliminates the problems existing in the conventional backlight module comprising a rubber or backplate, and the overall mechanical strength of the backlight module can also be ensured, the thickness of the backlight module can be decreased to meet the requirement on thinning of the display device, and the production and maintenance costs of the backlight module can also be reduced.

BRIEF DESCRIPTION OF THE DRAWINGS

Embodiments of the disclosure will be described below in more detail with reference to the accompanying drawings by way of non-limiting example, so as to provide a thorough understanding of the principle and spirit of the present disclosure. It is to be noted that the features and structures shown in the drawings do not necessarily represent the actual shapes and dimensions of the corresponding components and elements, but are merely used to illustrate the principles of embodiments of the present disclosure.

DETAILED DESCRIPTION OF EMBODIMENTS

Specific embodiments of the present disclosure will be described below in detail by way of examples. It is to be understood that embodiments of the invention are not limited to the examples set forth below, and that those skilled in the art can make modifications and variations to the described embodiments using the principle or spirit of the present disclosure to obtain other different embodiments. Apparently, these embodiments all fall within the protection scope of the invention.

In addition, it is to be noted that the drawings referred to herein are for the purpose of illustrating and explaining the embodiments of the present disclosure. The shape, dimension of each component and connections between different components as embodied in the drawings are merely used to illustrate the embodiments of the present disclosure and should not be construed as limiting the scope of the invention.

The light guide assembly provided by the embodiments of the present disclosure comprises a metal element and a light guide element which are formed together as one-piece. The light guide element is used to receive light emitted from an external light source to generate backlight.

Figure 1:
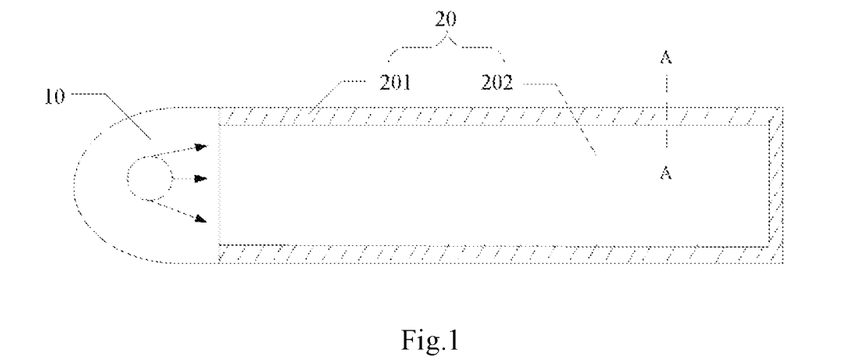
FIG. 1 illustrates a top view of a light guide assembly and an external light source according to an embodiment of the disclosure.

FIG. 1 illustrates a top view of a light guide assembly and an external light source according to an embodiment of the present disclosure. As shown in FIG. 1, a light guide assembly 20 comprises a metal element 201 and a light guide element 202 which are formed together as one-piece. At least a portion of at least one side surface of the light guide element 202 is used to receive light emitted from a light source 10 to generate backlight, and the metal element 201 surrounds the side surfaces of the light guide element 202 that do not receive light from the light source 10. If the light guide assembly 20 is applied to a backlight module, the external light source 10 may be a light source in the backlight module. In this case, although FIG. 1 shows that the light source 10 is in direct contact with the light guide assembly 20, in an actual backlight module, this is not necessary, and the light source 10 and the light guide assembly 20 may be permitted to have an appropriate spacing or gap therebetween. As shown in FIG. 1, the light emitted from the light source 10 can enter the light guide element 202 via one side surface of the light guide assembly 20, and the light guide element 202 may enable the received light to be emitted from its upper surface to thereby generate backlight. Thus, in the example of FIG. 1, the upper surface of the light guide element 202 is the light exit surface for backlight. In an embodiment, the lower surface (not shown in FIG. 1) of the light guide element 202 may be rough, for example, the lower surface may be provided with dots or bumps for reflecting light. In this way, the light received from the light source 10 can be emitted from the upper surface of the light guide element 202 by means of the total internal reflection in the light guide element 202 and the reflection by the dots or bumps on the lower surface thereof, thereby generating backlight. The technique with which the light guide element 202 enables the received light to be emitted from the upper surface thereof is known to those skilled in the art and will not be described here in detail. In addition, although only one light source 10 is shown schematically in FIG. 1, it is to be understood that the backlight module may comprise any suitable light source of a plurality of currently available light sources of various types, including, but not limited to, a linear light source such as a cold cathode fluorescent tube (CCFL), a point light source such as a light emitting diode (LED), and the like.

In this embodiment, since the light guide assembly 20 comprises the metal element 201 and the light guide element 202 which are formed together as one-piece, the light guide assembly 20 may have a relatively larger mechanical strength, which makes it possible to directly arrange other elements of the backlight module thereon.

A conventional backlight module is often further provided with a rubber frame (e.g., below the light guide assembly), which may serve to prevent light leakage from the light guide assembly, and also provide support for the respective elements thereon. In order to meet the requirements on thinning of the display device and narrowing of the frame of the display device, the rubber frame is also designed to be thinner, with its width becoming narrower, which results in a significant decrease in the support capacity of the rubber frame, and further causes the overall strength of the backlight module to decrease. At the same time, such a rubber frame becomes soft and easy to deform due to its characteristics of thinness and narrowness, thereby increasing difficulty in assembling the backlight module. Moreover, during the processes of use and maintenance of the backlight module, the rubber frame may easily become unusable due to deformation, resulting in waste of the rubber frame material. Another conventional backlight module technology is to design a backlight module with a backplate, which provides a backplate to support various other elements of the backlight module on the basis of the above-mentioned backlight module with a rubber frame. Typically, the backplate is arranged below the rubber frame as a bottom support element, and the rubber frame and the backplate can be designed as an integral structure or two separate structures. Although such a backlight module further enhances the mechanical strength of the backlight module, it also increases the material cost of the entire backlight module and is detrimental to the reduction in the thickness of the backlight module. To obtain a backlight module of the same thinness, it is necessary to make the light guide assembly become thinner, which increases difficulty in the design and development of the light guide assembly and increases the cost of the backlight module. In addition, if the rubber frame and the backplate are designed as an integral structure, since they have different shrinkage ratios, the resulting backlight module is liable to warpage.

With the light guide assembly 20 provided by the present embodiment, it is possible to alleviate or eliminate the problems existing in the production and maintenance of the conventional backlight modules and to reduce the thickness of the backlight module without affecting the overall mechanical strength of the backlight module, thereby meeting the requirement on thinning of the display device.

Specifically, as for the light guide assembly 20 provided by the present embodiment, since the metal element 201 and the light guide element 202 are formed as an integral structure, it has a large mechanical strength to support the respective elements thereon, and also facilitates enhancement of the overall mechanical strength of the backlight module; moreover, the metal element 201 can also prevent occurrence of light leakage in the light guide element 202. Therefore, such a light guide assembly makes it possible to omit the rubber frame and the back plate from the conventional backlight module. In this way, the problems existing in the conventional backlight module comprising a rubber frame can be alleviated or eliminated, while the overall mechanical strength of the backlight module can be ensured, the thickness of the backlight module is decreased to meet the requirement on thinning of the display device, and the production and maintenance costs can be reduced. In addition, since the rubber frame can be canceled, and the metal element and the light guide element are formed as an integral structure, accumulated tolerances between the respective elements in the backlight module provided by the embodiment of the disclosure can be reduced as compared to the conventional backlight modules, thereby effectively alleviating the problem of positioning deviation between the flexible circuit board (FPC) of the display device and the gold finger (electrically connected to the light source) of the backlight module to facilitate the manufacture and assembling of the display device.

The backlight module of the display device may have different shapes depending on the display device to which it is applied, thus the light guide assembly 20 therein may also have different shapes depending on the display device to which it is applied. For example, for a common mobile device such as a mobile phone, the light guide assembly 20 may have a substantially rectangular shape, and for a wearable display device such as a wristwatch, the light guide assembly may have other shapes such as an ellipse, a circle or a square, and the like. Therefore, although FIG. 1 schematically shows the light guide assembly 20 which is substantially rectangular, the embodiments of the present invention are not so limited.

It is to be noted that, although the whole side surface of the light guide element 202 shown in FIG. 1 opposite to the light source 10 is not surrounded by the metal element 201, it is to be understood that, in other embodiments, the metal element 201 may only surround part of the side surface of the light guide element 202 opposite to the light source 10, as long as an appropriate opening capable of receiving the light emitted from the light source 10 is reserved on this side surface.

In addition, the inventors of the present patent application have further proposed various solutions to make the metal element 201 and the light guide element 202 bonded together more firmly.

Figure 2:
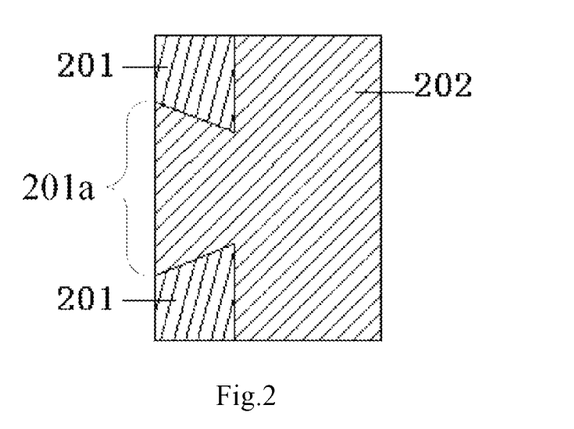
FIG. 2 illustrates a hole of a metal element in a light guide assembly according to another embodiment of the present disclosure.

In an embodiment, the metal element 201 may comprise at least one hole that penetrates at least the surface of the metal element 201 close to the light guide element 202, the hole being filled with a material of the light guide element. In other words, the light guide element 202 is not just in contact with the surface of the metal element 201 close to the light guide element 202, but also a part of the light guide element 202 can be accommodated into the hole in the metal element 201. In this way, the bonding force between the metal element 201 and the light guide element 202 can be enhanced due to the presence of holes, so that they are bonded together more firmly. In this embodiment, the surface of the metal element 201 close to the light guide element 202 may also be referred to as the inner surface of the metal element 201. FIG. 2 schematically shows a hole 201a in the metal element 201. Obviously, in other embodiments, the metal element 201 may comprise any number of such holes 201a. Moreover, in the embodiment illustrated by FIG. 2, the hole 201a may be a tapered hole, and the hole 201a of this shape may further enhance the bonding force between the metal element 201 and the light guide element 202. In addition, it is to be understood that the hole 201a may be a through-hole that penetrates the metal element 201 or a blind hole that penetrates only the inner surface of the metal element 201 without penetrating the outer surface of the metal element 201.

In the case where the hole 201a is a through-hole, it is necessary to take some measures to avoid the light leakage phenomenon resulting from the through-hole. Therefore, in an embodiment, the backlight module may further comprise a light-proof element for covering the hole 201a in the metal element 201. The light-proof element includes, but is not limited to, an ink coating, a light-proof adhesive tape, and the like. The ink coating can be formed by ink jet process, and the light-proof adhesive tape can be adhered to the metal element to cover the hole 201a, thereby alleviating or avoiding the possibility of light leakage on the light guide assembly 20.

Figure 3:
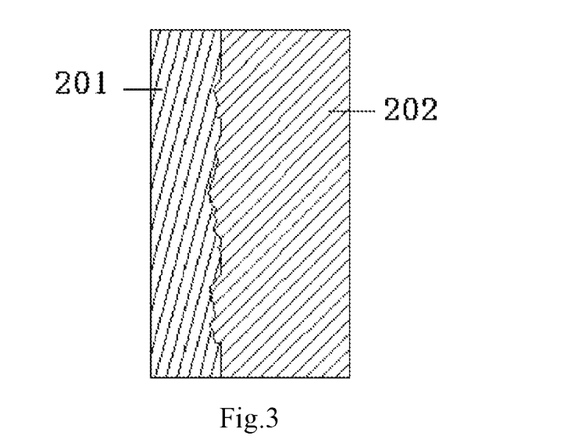
FIG. 3 illustrates a rough surface of a metal element in contact with a light guide element in a light guide assembly according to another embodiment of the present disclosure.

Alternatively, according to another embodiment of the present disclosure, in the light guide assembly 20, the surface of the metal element 201 that is in contact with the light guide element 202 is at least partially a rough surface, as shown in FIG. 3. Due to such a rough surface, the bonding force between the metal element 201 and the light guide element 202 can be enhanced, so that they are bonded together more firmly.

Figure 4:
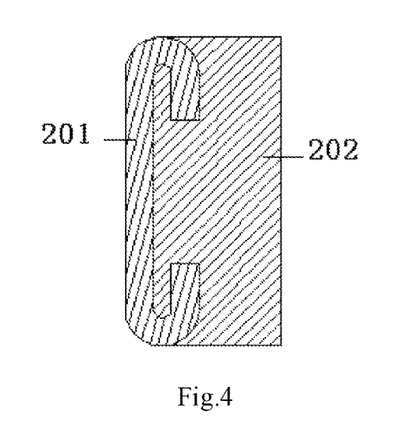
FIG. 4 illustrates a partial sectional view of the light guide assembly 20 taken along the broken line A-A shown in FIG. 1 according to an embodiment of the disclosure.

According to a further embodiment of the disclosure, the metal element may be designed to have a specific shape to facilitate its bonding with the light guide element 202. As shown in FIG. 4, it illustrates a partial sectional view of the light guide assembly 20 according to a further embodiment of the present disclosure, which may be obtained from the light guide assembly 20 as shown in FIG. 1 along the broken line A-A. In this embodiment, the metal element 201 comprises a first portion and a second portion connected together. The first portion surrounds the side surface of the light guide element 202 that is not used to receive the light from the light source, and the second portion is embedded into the light guide element 202 and forms a certain angle with respect to the first portion. As shown in FIG. 4, the first portion may be a flat portion of the metal element 201 that is tightly bonded to the side surface of the light guide element 202, and the second portion may be a curved portion that is embedded into the light guide element 202 and forms a certain angle with respect to the flat portion. It is to be understood that the second portion of the metal element 201 may form any suitable angle with the first portion thereof, as long as the second portion is in contact with the light guide element 202. For example, the second portion of the metal element 201 may not be embedded into the light guide element 202 as shown in FIG. 4, but may be perpendicular to the first portion of the metal element 201 and attached to the light guide element 202; the second portion of the metal element 201 may also be embedded into the light guide element 202 at any suitable angle with respect to the first portion thereof.

Furthermore, although FIG. 4 shows that the metal element 201 comprises two second portions embedded into the light guide element 202, in other possible embodiments, the metal element 201 may comprise only one second portion.

Figure 5:
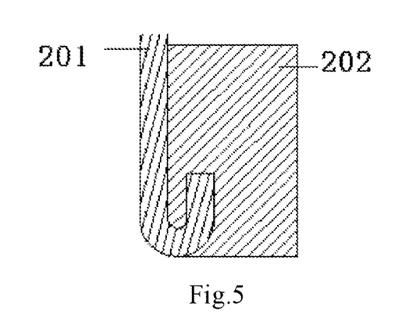
FIG. 5 illustrates a partial top view of a light guide assembly according to another embodiment of the present disclosure, where one end of a metal element in the light guide assembly is shown.

Alternatively, in yet another embodiment of the present disclosure, at least one of the two ends of the metal element may be embedded into the light guide element so to facilitate bonding between the metal element and the light guide element. As shown in FIG. 5, it illustrates a partial top view of the light guide assembly 20 according to yet another embodiment of the present disclosure, in which one end of the metal element 201 in the light guide assembly 20 is shown. As shown in FIG. 5, one end of the metal element 201 is embedded into the light guide element 202, so that the metal element 201 can be attached to the light guide element 202 more firmly. It is to be understood that the other end of the metal element 201 may also be embedded into the light guide element 202 in a similar manner, though it is not shown.

It is to be understood that while several embodiments of the light guide assembly 20 have been described above, in other embodiments of the invention, any combination of the above described embodiments of the light guide assembly 20 may be implemented to further facilitate tight bonding between the light guide element 202 and the metal element 201. That is to say, the light guide assembly 20 in other possible embodiments may have a combination of any features of the various features represented by the above described embodiments. For example, in a further embodiment, the metal element 201 in the light guide assembly 20 may be provided with the hole as shown in FIG. 2, the rough surface as shown in FIG. 3, the first portion and the second portion as shown in FIG. 4, and the end as shown in FIG. 5, simultaneously.

Figure 6:
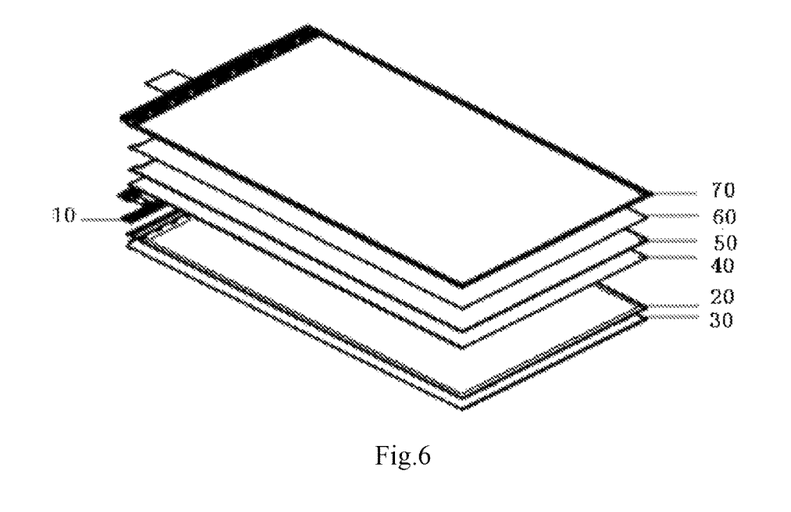
FIG. 6 illustrates a structural view of a backlight module according to an embodiment of the present disclosure.

As mentioned above, the light guide assembly provided by embodiment of the present disclosure can be applied to the backlight module of a display device. FIG. 6 illustrates a structural view of a backlight module having the light guide assembly as described in the above embodiments. In this example, the backlight module does not include a rubber frame or a backplate. As shown in FIG. 6, in this embodiment, the backlight module further comprises, in addition to the light guide assembly 20 and the light source 10 described above, a reflective element 30 below the light guide assembly 20. Although the light guide assembly 20 itself may enable the light received from the light source to be emitted from its light exit surface (e.g., upper surface), the possibility that some of the light would exit from other surfaces of the light guide assembly 20 still cannot be completely excluded. The reflective element 30 may redirect such light back to the light guide assembly 20, thereby improving the utilization efficiency of the light source of the backlight module. In an embodiment, the reflective element 30 may be formed of a material having a high reflectivity. For example, the reflective element 30 may include a polyethylene terephthalate (PET) layer and a polyester film below. The light entering into the PET layer may be reflected by means of the total reflection effect by the bubbles therein, and some other light may be reflected by the polyester film back to the light guide assembly 20.

As mentioned above, with the light guide assembly provided by the above embodiments, other elements in the backlight module can be directly disposed thereon. Therefore, the backlight module according to another embodiment of the present disclosure may further comprise optical elements above the light guide assembly. These optical elements may be selectively arranged depending on the desired characteristics of the backlight to be emitted, for example, an optical element for improving the optical properties such as uniformity, brightness, and the like of the emitted backlight may be selectively arranged.

As shown in FIG. 6, in another embodiment, the optical elements comprise a diffusion film 40, a brightness enhancement film 50, 60, and a light-shielding tape 70 disposed above the light guide assembly 20 from the bottom up. The diffusion film 40 is above and adjacent to the light guide assembly 20, and the backlight emitted from the light guide assembly 20 passes through the diffusion film 40 to produce diffuse reflection, so that the light distribution is more uniform, which facilitates uniformization of the in-plane brightness of the backlight module. In an embodiment, the diffusion film 40 may comprise a base layer, and a diffusion layer and a protective layer disposed above and below the base layer respectively. The base layer may be formed of a material having high light transmittance such as polyethylene terephthalate (PET), polycarbonate, or the like, and the diffusion layer and the protective layer may include a polymethyl methacrylate material. For example, the diffusion layer may include polymethyl methacrylate particles with irregular particle sizes as diffusion particles. Light, when passing through the diffusion layer, may continuously penetrate two media with different refractive indexes, which causes the light to produce many refraction, reflection and scattering phenomena, achieving an optical diffusion effect. The brightness enhancement film 50, 60 may increase the brightness of the backlight emitted from the backlight module, thereby facilitating improvement of the image quality of the display device to which the backlight module is applied.

In the embodiment shown in FIG. 6, the brightness enhancement film may comprise a first prism 60 and a second prism 50 arranged from the up down. Therefore, the brightness enhancement film can be used as a light concentrating device for concentrating the light emitted from the diffusion film 40 within a certain angle range by means of total reflection and refraction of the light in the prisms, thereby increasing the brightness of the emitted light. Part of the light emitted from the diffusion film 40 may directly exit through the second prism 50 and the first prism 60, and other part of the light may circulate between the diffusion film 40, the second prism 50, and the first prism 60 due to refraction and total reflection until it meets the conditions for exiting from the first prism 60. The first prism 60 shown in FIG. 6 can capture the light escaping from the second prism 50, thereby improving the utilization efficiency of the light source of the backlight module. Nevertheless, it is to be understood that in other possible embodiments, it is also possible to only provide one prism.

According to another embodiment of the disclosure, the light guide element may not be a regular structure, for example, it may comprise a raised structure perpendicular to its upper surface, which can be used to carry the optical element of the backlight module described above.

Figure 7:
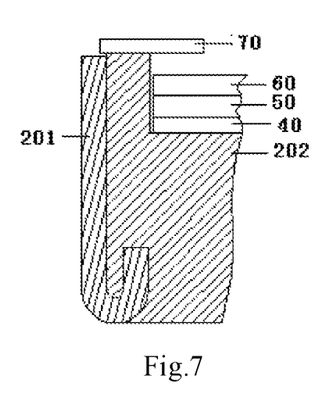
FIG. 7 illustrates a partial sectional view of a backlight module according to a further embodiment of the present disclosure.
Figure 8:
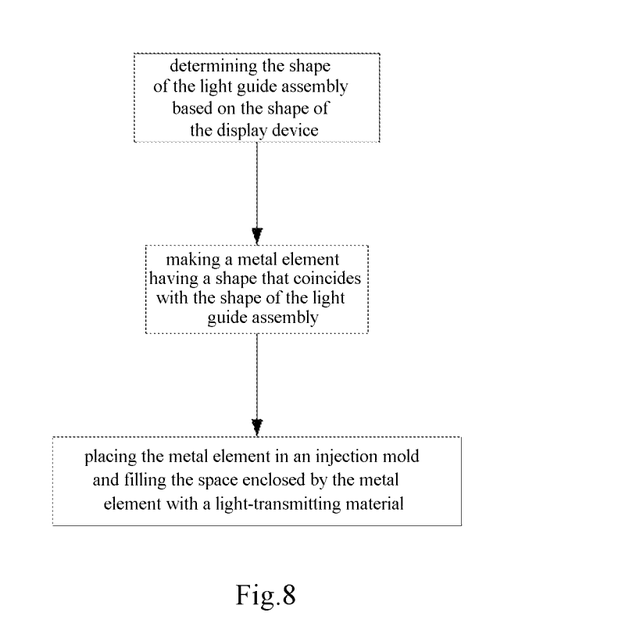
FIG. 8 illustrates a flow chart of a method of manufacturing a light guide assembly according to an embodiment of the present disclosure.

FIG. 7 shows a partial sectional view of a backlight module according to another embodiment of the disclosure, the partial section shown in FIG. 7 may be perpendicular to the upper surface of the backlight module. As shown in FIG. 7, the raised structure of the light guide element 202 comprises a first step for carrying the diffusion film 40, the second prism 50 and the first prism 60, and a second step for carrying the light-shielding tape 70. With such a raised structure, various optical elements can be arranged above the light guide assembly in a simple manner at low cost, thereby facilitating simplification of the structure of the backlight module and reduction in the manufacture and assembling costs of the backlight module.

According to an embodiment of the disclosure, the metal element 201 of the light guide assembly 20 may be formed using any suitable metal material including, but not limited to, iron, stainless steel, and the like. The light guide element 202 may be formed using any suitable light-transmitting material, including, but not limited to, polymethyl methacrylate, cycloolefin polymers, polycarbonates, and the like.

Various embodiments of the backlight module of the present disclosure have been described above. In these embodiments, the rubber frame and the backplate used in the conventional backlight module can be omitted, which can alleviate or eliminate some problems existing in the conventional backlight module without affecting the mechanical strength of the backlight module, and decrease the thickness of the backlight module to meet the requirements of thinning of the display device and narrowing of the frame of the display device, and may reduce the production and maintenance costs of the backlight module.

Another embodiment of the disclosure provides a display device which may include a display module provided by any of the embodiments described above. Such a display device may be any display device that requires a backlight module as a backlight source. Examples of the display device include, but are not limited to, any electrical apparatus having display function such as LCD display, television set, mobile phone, personal digital assistant, tablet computer, notebook computer, desktop computer, and the like. Since these display devices comprise the display module described in any of the embodiments above, they also have the features and advantages of the display module accordingly, which are not repeated here.

Another embodiment of the disclosure further provides a method of manufacturing a light guide assembly in the backlight module. The light guide assembly comprises a metal element and a light guide element which are formed as one-piece. The method may comprise the steps of: determining the shape of the light guide assembly based on the shape of the display device to which the backlight module is applied; making a metal element having a shape that coincides with the shape of the light guide assembly; placing the metal element in a corresponding injection mold and filling the space enclosed by the metal element with a light-transmitting material to form a light guide element.

At present, there have been a variety of display devices with different shapes to satisfy different people's aesthetic needs and personalized requirements on the display device. Accordingly, the backlight module of the display device and the light guide assembly in the backlight module also need to have similar shapes. Therefore, in the embodiment of the method of manufacturing the light guide assembly in the backlight module of the disclosure, the shape of the light guide assembly is first determined based on the shape of the display device to which the backlight module is applied. For example, for a mobile device such as a common mobile phone, the shape of the light guide assembly may be determined to be substantially rectangular, and for a wearable device such as a common wristwatch, the shape of the light guide assembly may be determined to be substantially circular, square or oval, and so on. Therefore, the shape of the light guide assembly is not limited herein, which is determined based on the shape of the display device to which it is actually applied. Then, a metal element having a shape that coincides with the shape of the light guide assembly can be made. In this way, the shape of the metal element is determined, so the shape of the light guide assembly can also be generally determined. Thereafter, in the present embodiment, the integration of the metal element and the light guide element can be achieved by means of an injection mold. In this embodiment, the shaped metal element may be placed in a corresponding injection mold and the space enclosed by the metal element is filled with a light-transmitting material to form a light guide element. For example, after the metal element is placed in the injection mold, a hot melted light-transmitting material can be injected into the cavity of the injection mold under high pressure, and after cooling and solidification, an integrated structure of the light guide element and the metal element can be formed. In this way, the light guide assembly of the backlight module can be manufactured in a relatively simple manner at low cost. During the manufacturing process, the light-transmitting material used may include, but is not limited to, any one of polymethyl methacrylate, cycloolefin polymer and polycarbonate.

Further, in the method of manufacturing the light guide assembly of the backlight module as provided by the embodiment of the disclosure, the step of making the metal element may further comprise: making a metal element so that its length is smaller than the circumference of the light guide assembly. By determining the length of the metal element in advance and making it smaller than the circumference of the light guide assembly, the final metal element would not completely surround the light guide element, thereby preparing for the formation of the side surface portion of the light guide assembly for receiving light emitted from the light source. Further, the step of making the metal element may further comprise: making a metal element such that it forms a non-closed curved structure having an opening, so that the formed light guide assembly can receive light emitted from the light source of the backlight module via the opening. It is to be understood that the shape of such a non-closed curved structure may correspond to the determined shape of the light guide assembly.

In another embodiment, the step of making the metal element may further comprise forming at least one hole in the metal element for filling the light-transmissive material. As previously discussed, such holes can accommodate the material of the light guide element, which can enhance the bonding force between the light guide element and the metal element, benefiting the mechanical strength of the formed light guide assembly. As previously discussed, such holes may be through-holes or blind holes, and may have different shapes, for example, tapered holes.

For an embodiment in which a through-hole is formed in the metal element, a light-proof element may be further used to cover the formed hole. For example, the light-proof element may be formed by ink-jet process, or a light-proof adhesive tape may be used as the light-proof element, thereby preventing light leakage from the light guide assembly.

In another embodiment, the step of making the metal element may further comprise forming on the metal element a rough surface for contact with the light guide element. The rough surface can also facilitate more secure bonding between the metal element and the light guide element, which is beneficial to the mechanical strength of the light guide assembly.

In a further embodiment, the step of making the metal element may further comprise forming a first portion and a second portion of the metal element, which are connected together. The first portion surrounds the side surface of the light guide element that is not used to receive the light from the light source, and the second portion is embedded into the light guide element and forms a certain angle with respect to the first portion.

In yet another embodiment, the step of making the metal element may further comprise forming two ends of the metal element so that at least one of the two ends is embedded into the formed light guide element.

These measures are beneficial to facilitating tighter bonding between the metal element and the light guide element, and when making the metal element, a combination of any steps of the steps of making the metal element as described above can be employed so as to further promote tight bonding between the metal element and the light guide element.

In another embodiment, at the time of making the light guide element in the backlight module, a light-transmitting material may be further used to form a raised structure perpendicular to the upper surface of the light guide element for carrying the optical elements in the backlight module.

While embodiments of the disclosure have been described in detail with reference to the accompanying drawings, it is to be noted that the above embodiments are illustrative while not limiting the invention. Moreover, those skilled in the art can design many alternative embodiments without departing from the scope of the enclosed claims. In the claims, the word "comprises" or "comprising" does not exclude other elements or steps than those stated in the claims, and the indefinite article "a" or "an" preceding an element does not exclude a plurality. The mere fact that certain measures are recited in mutually different dependent claims does not indicate that a combination of these measures cannot be used to advantage.

The invention claimed is:

1. A light guide assembly for a backlight module, comprising a metal element and a light guide element which are integrated together, at least a portion of at least a side surface of the light guide element being used to receive light emitted from a light source to generate backlight, the metal element surrounding side surfaces of the light guide element that are not used to receive light from the light source,
   wherein the metal element comprises at least one hole penetrating at least an inner surface of the metal element adjacent to the light guide element, the hole being filled with a material of the light guide element, wherein the hole is one of a tapered through hole and a blind hole that just penetrates the inner surface of the metal element without penetrating an outer surface thereof.

2. The light guide assembly according to claim 1, wherein the light guide assembly further comprises a light-proof element for covering the hole.

3. The light guide assembly according to claim 2, wherein the light-proof element comprises an ink coating or a light-proof adhesive tape.

4. The light guide assembly according to claim 1, wherein the inner surface of the metal element in contact with the light guide element is at least partially rough surface.

5. A backlight module not having a backplate and a rubber frame, comprising a light source and a light guide assembly, wherein the light guide assembly comprises a metal element and a light guide element which are integrated together, at least a portion of at least a side surface of the light guide element being used to receive light emitted from the light source to generate backlight, the metal element surrounding side surfaces of the light guide element that are not used to receive light from the light source,
   wherein the metal element comprises at least one hole penetrating at least an inner surface of the metal element adjacent to the light guide element, the hole being filled with a material of the light guide element, wherein the hole is one of a tapered through hole and a blind hole that just penetrates the inner surface of the metal element without penetrating an outer surface thereof.

6. The backlight module according to claim 5, wherein the backlight module further comprises an optical element above the light guide assembly.

7. The backlight module according to claim 6, wherein the light guide element comprises a raised structure perpendicular to its upper surface, the raised structure being used for carrying the optical element.

8. The backlight module according to claim 7, wherein the raised structure comprises a first step and a second step for carrying different optical elements.

9. The backlight module according to claim 5, wherein the light guide assembly further comprises a light-proof element for covering the hole.

10. The backlight module according to claim 9, wherein the light-proof element comprises an ink coating or a light-proof adhesive tape.

11. The backlight module according to claim 5, wherein the inner surface of the metal element in contact with the light guide element is at least partially rough surface.

12. A display device comprising a backlight module not having a backplate and a rubber frame, the backlight module comprising a light source and a light guide assembly, wherein the light guide assembly comprises a metal element and a light guide element which are integrated together, at least a portion of at least a side surface of the light guide element being used to receive light emitted from the light source to generate backlight, the metal element surrounding side surfaces of the light guide element that are not used to receive light from the light source, wherein the metal element comprises at least one hole penetrating at least an inner surface of the metal element adjacent to the light guide element, the hole being filled with a material of the light guide element, wherein the hole is one of a tapered through hole and a blind hole that just penetrates the inner surface of the metal element without penetrating an outer surface thereof.

13. The display device according to claim 12, wherein the light guide element comprises a raised structure that is perpendicular to its upper surface and used for carrying optical elements, wherein the raised structure comprises a first step and a second step for carrying different optical elements.

* * * * *